July 25, 1967 B. STAHMER 3,332,434
CARRIER SYSTEM FOR SUPPLYING POWER LINES TO
RECIPROCATING MACHINES
Filed July 1, 1965 4 Sheets-Sheet 3
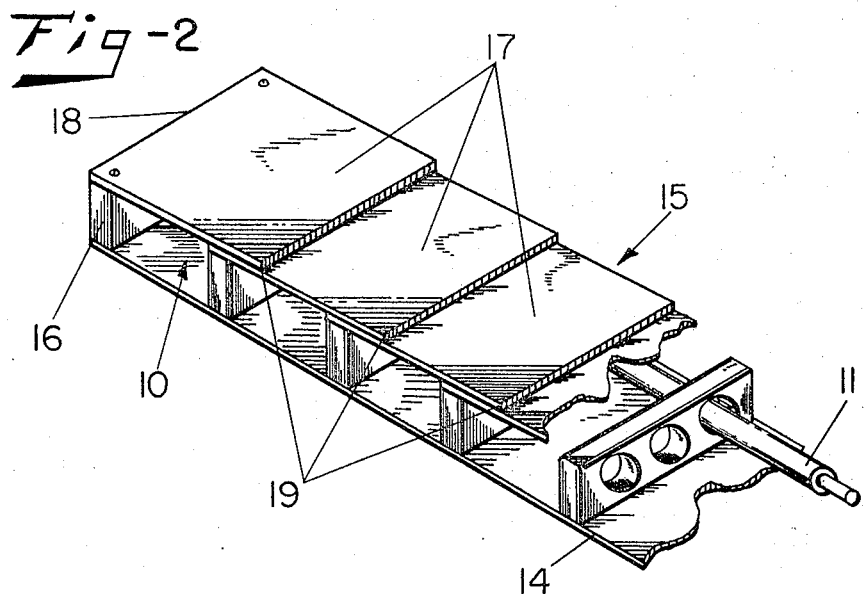
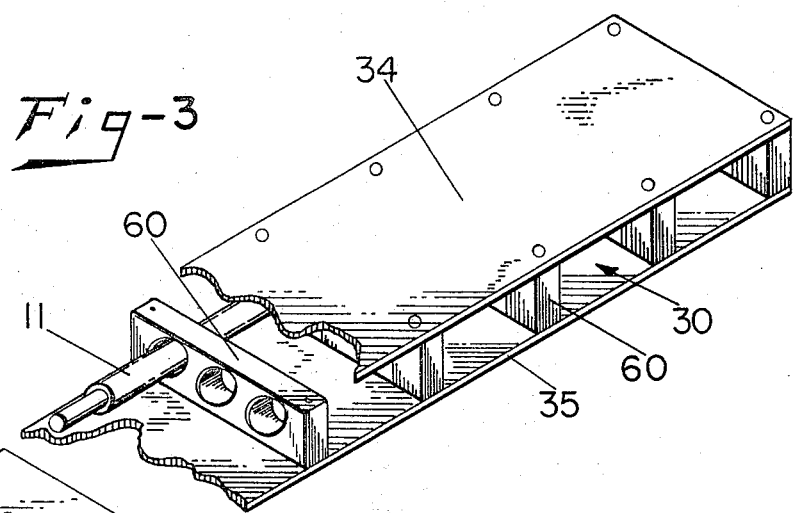
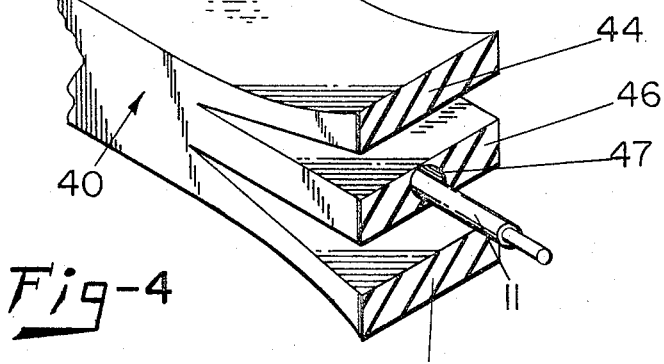
INVENTOR.
BERNHARDT STAHMER
BY George R Nimmer
ATTORNEY

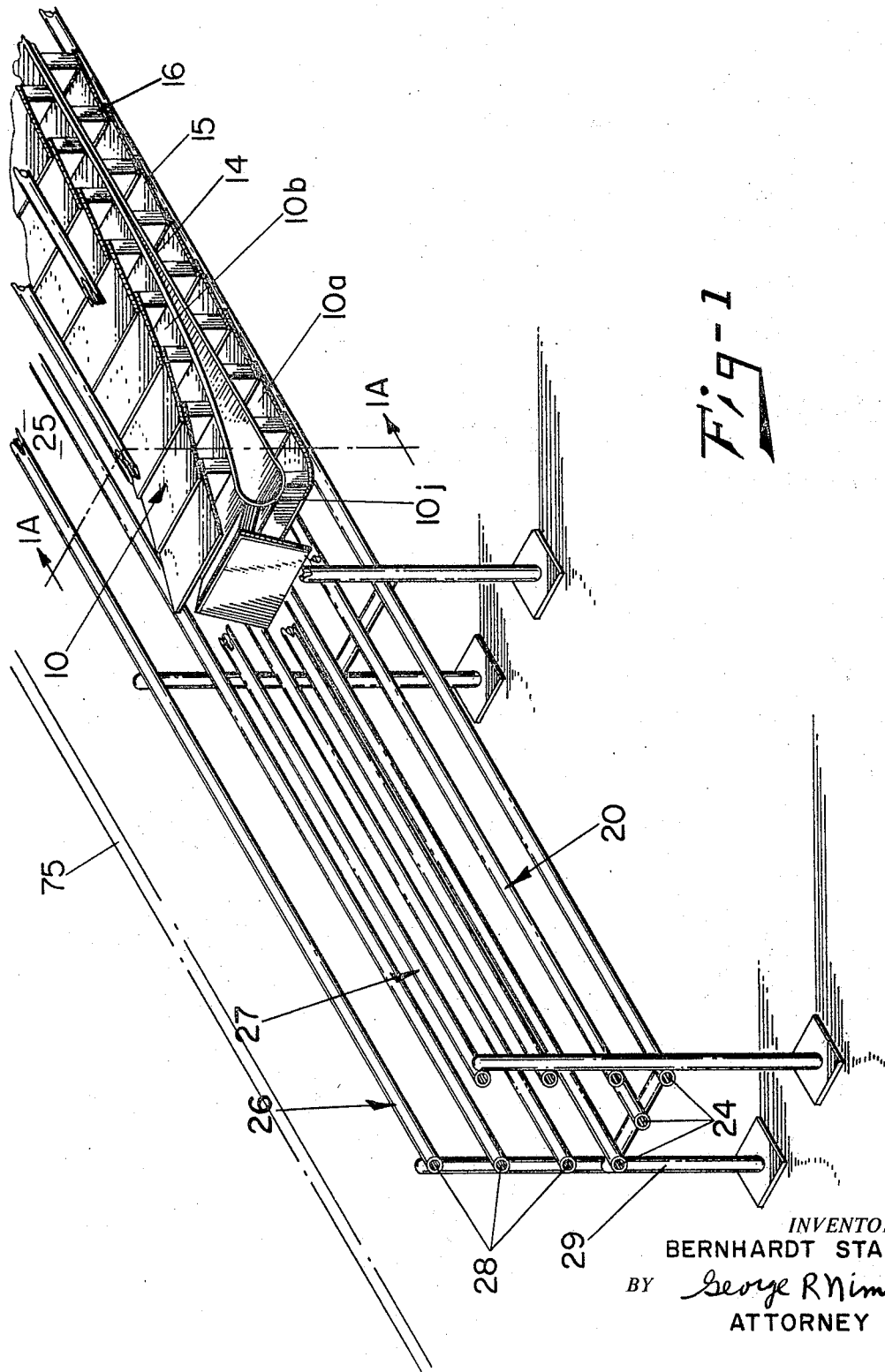

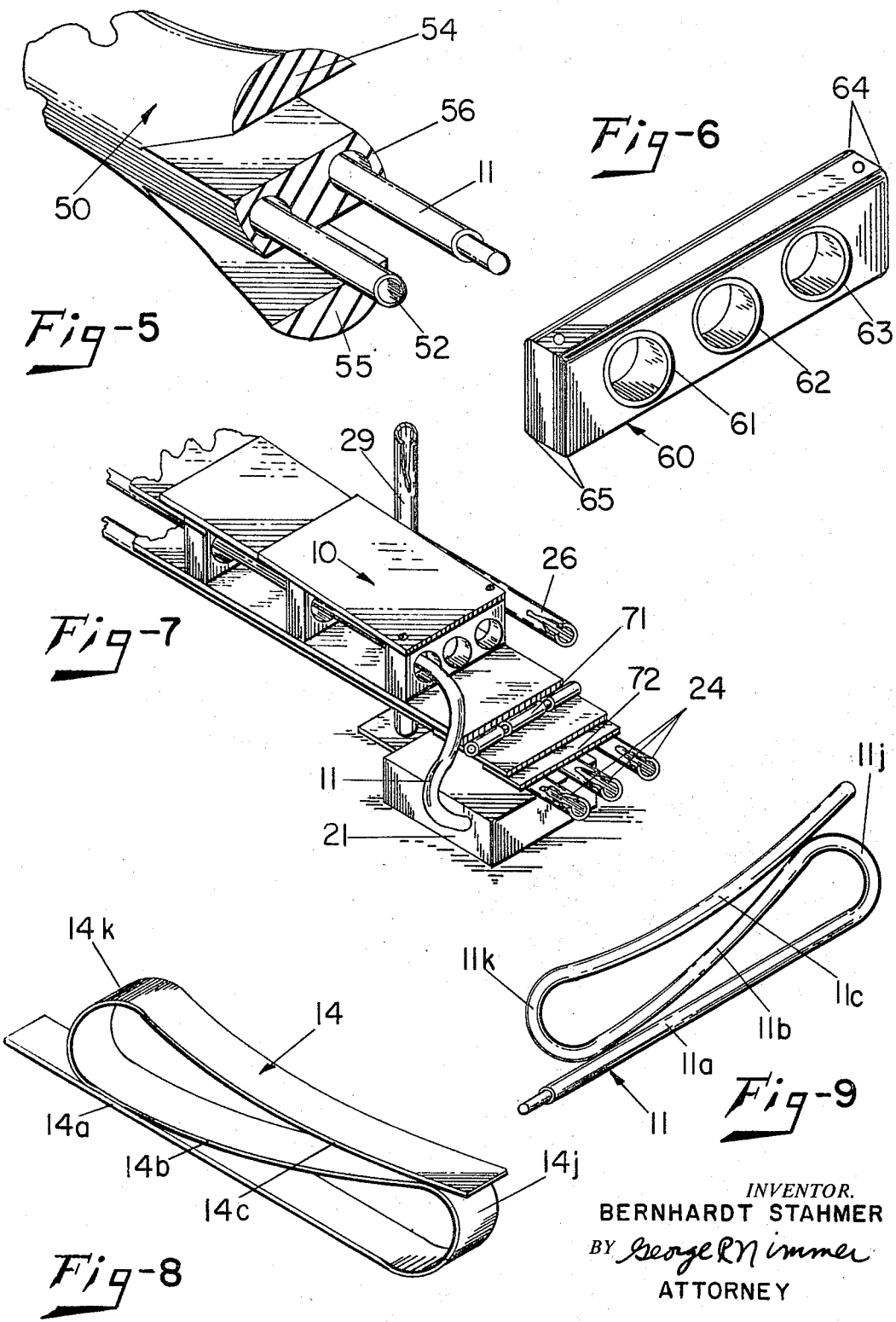

United States Patent Office 3,332,434
Patented July 25, 1967

3,332,434
CARRIER SYSTEM FOR SUPPLYING POWER
LINES TO RECIPROCATING MACHINES
Bernhardt Stahmer, 1509 Chicago St.,
Omaha, Nebr. 68102
Filed July 1, 1965, Ser. No. 468,682
9 Claims. (Cl. 137—355.17)

This invention relates to an improved device for supplying flexible conduits of power lines from a stationary power supply source to a power actuatable machine of the type that is horizontally translatable or reciprocatable along a given linearly generated path. In particular, this invention relates to a novel undulately flexible carrier belt adapted to supportably enclose at least one flexible power line conduit and a novel guidance means for the carrier belt.

In factory operations and on construction sites it is oftentimes necessary to supply flexible conduits of power lines, e.g. steam, compressed air, hydraulic fluid, electrical conductors etc., for the actuation of horizontally translatable or reciprocatable machines. For example, such horizontally movable machines might typically include lathes, machine tools of various kinds, trolleys, hoists, cranes, and materials handling systems. A satisfactory carrier system is required for the flexible conduits. A satisfactory carrier system must include a housing for the flexible power line conduits leading to the horizontally reciprocatable machine (especially for those machines which travel extensively) because unprotected flexible conduits are apt to become kinked or pinched, thus interfering with or even totally disrupting the power line. Further, a carrier system should include a guidance means to controllably direct the conduits to the machine and to prevent both singular and collective snarling and tangling of the power lines.

The prior art has endeavored to provide a suitable carrier system in a variety of ways, all of which possess disadvantages of one sort or another. For supplying electrical power lines exclusively, carriers supplied from reels cooperating with brushes are known. In the case of electrical conductors cooperating with brushes, however, only a relatively small number of conductors can be used because the spae requirements of such arrangements are very great. Also, to avoid the brushes slipping off the conductors it is essential that the conductors should be arranged accurately parallel to the slideway, which makes the installation difficult. Deposits of cast iron, carbon or brass dust, and moisture in the air can very easily lead to resultant damage due to leakage currents or even to short circuits. Sliding contacts thus constitute a cause of unreliability. To ensure reliable operation sliding contact arrangements need constant maintenance. Further, exposed electrical conduits need protection from contact with metal parts such as turnings, tools or loose appliances as well as from the the translatable machine itself, and thus can only be used to a limited extent without additional measures.

In an effort to do away with brushes, the prior art has endeavored to fixably connect electrical power lines between the power source and the movable machine. Such fixed connections are especially appropriate to non-electrical power lines, or to a collection of electrical and non-electrical power lines. Such hetero-power carrier systems comprise a permanently or fixably connected power line for each type power line required by the movable machine. The power lines are contained within a generally horizontal, yet vertically festooned or "looped-over" housing means. Invariably, the hetero-power carrier systems of the prior art utilize bulky and heavy housing means to prevent kinking and pinching of the power line conduits. Commonly, the conduit housing means of the prior art include bulky chain-like link structures or similarly cumbersome systems. Because of the cumbersome nature of the conduit housing means, the carrier system guidance means is correspondingly heavy and bulky often including elevated runways and tracks, rollers, elaborate spring mechanisms, and even auxiliary power sources to transport the unwieldy conduit housing. Further because of the unwieldy nature of prior art carrier systems for fixably connected power lines, the length of travel for the translatable machine is necessarily limited.

It is accordingly an object of the present invention to provide a carrier system for fixably connected flexible power line conduits, the carrier system having a protective housing means that will prevent the conduits and the enclosed power line from being kinked or pinched.

It is another object of the present invention to provide a conduit housing means that will protect the conduits from dirt, chips, and other exterior fouling.

It is another object to provide a conduit housing means that is compact and exceedingly light in weight per unit length so that the conduit housing means requires a minimum of space and may be supplied to the moving machine without an exterior power source.

It is yet another object of the present invention to provide a carrier system housing means that is sufficiently light in weight and of appropriate exterior configuration that said housing will undulately support itself in a plurality of vertically aligned segments.

It is yet another object to provide a guidance means for the housing means that is of simple construction, without cumbersome rollers, tracks, or other mechanisms for the vertically aligned segments of the undulatable housing.

It is a further object of the present invention to provide a carrier system that is adaptable to all sorts of power lines and that is exceedingly simple and economical to manufacture.

These and other objects and advantages are provided with a housing means for the power line conduits in the form of a novel elongate flexible carrier belt that is undulately foldable upon itself, a terminal portion of said carrier belt being attached transversely across an elongate guidance trough, the generally horizontal undulated carrier belt being free to slide upon itself and pivot back and forth along the trough interior in a rollable arcuate fashion.

In the drawing, wherein like numbers indicate like parts in the several views, and in which:

FIGURE 1 is a perspective view of the preferred form of the power line carrier system of the present invention. A horizontally translatable machine is shown in phantom line. FIGURE 1 is extended over onto a second sheet as FIGURE 1A because of the elongate nature of the carrier system.

FIGURE 2 is a detail perspective view of a representative portion of the preferred form of the carrier belt housing of FIGURES 1 and 1A.

FIGURE 3 is a detail perspective view of a representative portion of another form of the carrier belt housing.

FIGURE 4 is a detail perspective view of a representative portion of another form of the carrier belt.

FIGURE 5 is a detail perspective view of a representative portion of yet another form of the carrier belt.

FIGURE 6 is a perspective view of the preferred type of spacer block that is preferably utilized in the FIGURE 3 embodiments.

FIGURE 7 is a perspective view showing an alternate pivotal connection for the carrier belt terminal portion transversely across the guidance trough.

FIGURE 8 is a perspective view showing a flexible structurally continuous shield strap in an undulate form.

FIGURE 9 is a perspective view showing a flexible power line conduit in an undulate form.

Figure 1A:
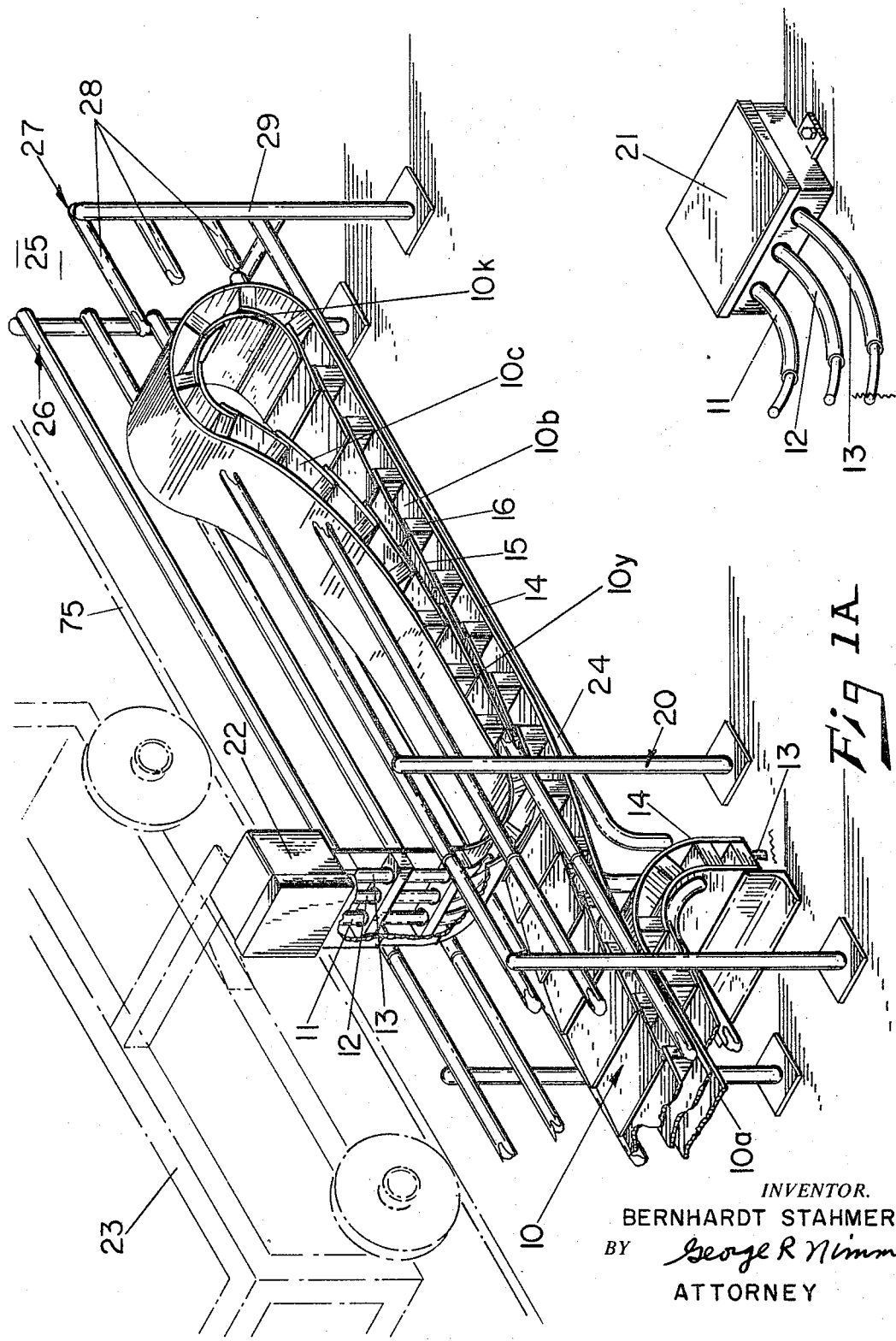

As can be seen in the FIGURE 1 general or overall view, the carrier system comprises a generally horizontal, flexible elongate carrier belt 10 that is undulately foldable upon itself and an elongate trough 20 of rectangular cross-section by which the carrier belt 10 is contained and slidably guided. Elongate carrier belt 10 slidably encloses a plurality of conduits 11, 12, and 13, each conduit enclosing an appropriate power line e.g. steam, compressed air, hydraulic fluid, electrical conductor etc. For purposes of typical illustration, and not by way of limitation, conduits 11, 12, and 13 may each be as #12 AWG insulated electrical conductor having a weight of about 0.235 pounds per lineal foot and an outside diameter of about 0.635 inch. The respective power line conduits are connected between a power source, herein indicated as in inlet box 21, and the outlet box 22, which is mounted upon the horizontally translatable or reciprocatable powered machine 23, shown herein in phantom line. Carrier belt 10 comprises a pair of opposed, substantially parallel elongate shields 14 and 15; shield 14 is a structurally continuous strap while shield 15 is of a multi-panel imbricate structure. There are appropriate spacer means between conterminous shields 14 and 15, herein as a plurality of spacer blocks 16 attached against the inner surfaces of said elongate shields, to maintain the shields in an opposed relationship. As will be pointed out more specifically later, the spacer means are provided with distinct elongate passageways for loosely slidable accommodation of conduits 11, 12, and 13, said conduits being substantially coextensive with the length of carrier belt 10 and slightly smaller than the passageways.

Carrier belt housing means 10 is so designed to undulately support enclosed power line conduits that are in themselves independently undulately foldable, as shown in FIGURE 9. The conduit employed e.g. 11, must be sufficiently flexible so as to be undulately foldable in either of two opposite directions for at least three vertically aligned segments 11a, 11b, and 11c, the folded juncture between every consecutively adjacent segment e.g. juncture 11j between 11a and 11b, being of an arcuate configuration.

As shown in FIGURE 1, to undulately support an undulately foldable power line conduit, carrier belt 10 is designed to be undulately foldable upon itself for a plurality of, and preferably for at least three, vertically aligned segments 10a, 10b, and 10c, the folded juncture between every consecutively adjacent segment e.g. juncture 10j between segments 10a and 10b, being of an arcuate configuration. Obviously, when generally rectangular shields 14 and 15 are employed, the inter-shield folded juncture is of a curvilinear-arcuate configuration. Each upper segment of the undulate structure assumes an elongate intra-shield contact with the segment immediately therebeneath e.g. line 10y between segments 10a and 10b. As can be seen in FIGURE 8, at least one of said elongate shields e.g. shield 14, must be a structurally continuous member of sufficient flexibility so as to be undulately foldable in either of two opposite directions for a plurality of, and preferably at least three, vertically aligned segments 14a, and 14b and 14c, the folded juncture between every consecutively adjacent segment e.g. juncture 14j between segments 14a and 14b, being of an arcuate configuration.

As seen in FIGURE 1, elongate guidance trough 20 has a linearly generated central axis that generally corresponds to the reciprocating path of horizontally translatable powered machine 23. Trough 20 essentially comprises a lower boundary 24, an open top 25, and parallel upright sides 26 and 27, said upright sides being so spaced to slidably engage carrier belt 10 therebetween. Further, upright sides 26 and 27 are of sufficient height to laterally engage a plurality of, and preferably at least three, vertically aligned segments of said undulately foldable carrier belt. Although trough 20 of FIGURE 1 comprises a plurality of elongate sideward bars 28 attached to upright standards 29, it is obvious that structurally continuous or closed trough side walls could be employed with similar results.

It is essential that a terminal portion of the carrier belt be pivotably attached transversely across the lower boundary of the elongate trough 20. Further, for the reasons to be pointed out in the following paragraph, it is essential that a terminal portion of the carrier belt be adapted to be stably supported upon the lower boundary 24 of trough 20. These two essential requisites can readily be provided in the following two illustrative fashions. A terminal portion of the carrier belt can be fixably attached at or below trough lower boundary 24; the undulate foldability of the carrier belt will inherently provide the required pivotal relationship and will allow the terminal portion to bend toward and to be stably supported upon trough lower boundary 24. This method is shown in FIGURE 1. To provide an ever greater degree of pivotal motion, as in FIGURE 7. One end of carrier belt 10 can be pivotably attached transversely of lower boundary 24 as by means of dual-plate hinge 71, said hinge being conveniently located slightly above lower boundary 24 with bar 72 that is welded transversely across lower boundary 24. Obviously, the terminal portion of the carrier belt can be pivotably disposed at any point along trough bottom 24. Preferably, power input box 21 should be positioned adjacently nearby the pivotal portion of the carrier belt.

Operation of the carrier system is as follows. As the horizontally translatable machine 23 reciprocates along its own track 75 which is parallel to the elongate central axis of trough 20, the carrier belt 10, which is fixably connected transversely of trough lower boundary 24 and power output box 22 on machine 23, follows reciprocatable machine 23. As machine 23 travels rightwardly to the length limit of carrier belt 10, the carrier belt progressively unwinds from its undulate form so as to become eventually non-folded or horizontal so the entire length of continuous strap shield 14 lies tautly along and is supported by trough lower boundary 24. As carrier belt 10 is being so unwound from its undulate form, there must be slidable intra-shield contact between the consecutively adjacent segments. Thus, the shields are preferably planar and of a low co-efficient of friction. As the machine 23 reciprocates in movement, the carrier belt 10 begins to accordingly reverse its direction of travel, thus becoming undulately folded in a precise fashion that is dependent upon the number of translated distances of the machine reciprocations. If machine 23 should travel leftwardly to the length limit of carrier belt 10, the carrier belt progressively unwinds from the intermediate undulate form assumed so as to become non-folded or horizontal so that multi-panel imbricate upper shield 15 lies tautly along and is supported by trough interior bottom 24. Thus, it can be seen that carrier belt 10 must pivot with respect to trough bottom 24 every time that it becomes pulled to an opposite horizontal limit by machine 23. It is for this reason, a terminal portion of carrier belt 10 must have a transverse pivotal relationship with respect to trough bottom 24.

It is obvious that the imbricate multi-panel structure of FIGURES 1 and 2 does have two distinct radii of curvature for the folded junctures depending upon whether the imbricate shield 15 is positioned outwardly or inwardly of the undulate structure. For example, arcuately folded juncture 10j between segments 10a and 10b is of slightly lesser radius than is arcuately folded juncture 10k between segments 10b and 10c.

As can be seen in the cutaway of FIGURES 1 and 2, the spacer means comprise a plurality of rigid spacer blocks 16, lengths of which are substantially perpendicular to the longitudinal or elongate axes of conterminous shields 14 and 15, and these transverse lengths each being substantially coextensive with the transverse width of shields 14 and 15 so as not to interfere with trough sides 26 and 27. Spacer blocks 16 are spaced at substantially regular intervals along the length of and attached to the inner surfaces of shields 14 and 15 with appropriate fastener means e.g. nails, screws, etc. The cross-sectional shape of each spacer block in a direction along the shields central axes or perpendicular to the transverse length of said spacer blocks is substantially rectangular. The spacer means e.g. blocks 16, are each provided with one or more perforations therethrough in the elongate direction of said shields, said direction being synonymous with the width of the block. Thus, the registered perforations of the several spacer blocks 16 provide one or more elongate distinct internal passageways for slidable accommodation of power line conduits, said passageways being substantially parallel to the elongate central axes of said opposed shields 14 and 15. As can be seen in FIGURES 1–5 inclusively, the elongate passageways should be slightly larger cross-sectionally than the cross-section dimensions of the power line conduits to be enclosed so that said power line conduits are free to slide and flex within said passageways.

As can be clearly seen in FIGURES 1 and 2, the flap-like imbricate shield 15 comprises a plurality of rectangular panels 17. A fixed end 18 of each panel 17 is attached to a spacer block 16 with suitable fastener means, the free or flap end 19 of each panel 17 overlapping the fixed end 18 of an adjacently contiguous panel. The respective flap-like free ends 19 are closer than fixed ends 18 to that terminal portion of carrier belt 10 which is attached transversely of trough bottom 14; in this manner, there is an intra-shield slidability along the elongate intra-shield contact of carrier belt 10.

The alternate carrier belt 30 shown in FIGURE 3 is economically preferred because both parallel opposed conterminous shields 34 and 35 are as rectangular structurally continuous straps, each being sufficiently flexible to possess the undulate foldability of rectangular strap 14. However, when two structurally continuous strap shields are employed, there is apt to be some undesirable buckling or wrinkling of that strap at the interior arcuate curvature of the folded junctures. Such buckling or wrinkling is not so apt to occur when one of the shields is of the imbricate variety e.g. 15. However, even when two structurally continuous strap shields 34 and 35 are employed, the buckling or wrinkling problem can be minimized when the spacer block 60 shown in FIGURE 6 is employed. Spacer block 60 is substantially identical to spacer blocks 16 herebefore described except that the transverse lengths e.g. 64 and 65, are chamfered to enhance undulate foldability of carrier belt 30. Further, both ends of every spacer block perforation e.g. 61, 62, and 63, are slightly enlarged with a chamfered portion to enhance the undulate foldability of a power line conduit slidably enclosed within the inter-blocks passageways. The chamfered-ends perforations may also be advantageously employed within the FIGURES 1 and 2 preferred embodiment.

The carrier belt 40 embodiment shown in FIGURE 4 comprises the pair of elongate conterminous opposed strap shields 44 and 45 held apart in a substantially parallel relationship by means of a single elongate spacer block 46. There is at least one elongate passageway 47 parallel to the elongate central axes of shields 44 and 45 to slidably accommodate an elongate power line conduit 11 therein. For convenience in manufacture, the shields 44 and 45, together with elongate spacer block 46 may be provided of a plastic or resinous material, the components being integrally molded together in an attached unitary relationship.

When the outer surfaces of the shields are substantially flat, as indicated in the three embodiments of FIGURES 1–4, the resultant carrier belt will guide itself without a guidance trough 20 provided the width of the carrier belt structure exceeds about 10 inches and the thickness or height exceeds about 2 inches. When the dimensions exceed these values, the inflexibility or rigidity of the carrier belt in the lateral directions inherently guide or track the carrier belt to follow the reciprocating machine 23. Tests conducted with a carrier belt having a length of 25 feet, a transverse width of 10 inches and a thickness of 2 inches demonstrate the feasibility of such a troughless, self-guiding carrier belt. A terminal portion of the self-guiding carrier belt is attached transversely of a longitudinal central axis that is substantially parallel to the path of the reciprocating machine.

As can be seen in the FIGURE 5 embodiment, the outer surfaces of the elongate shields may readily take a non-planar form. Herein, the outer surfaces of strap shields 54 and 55 of carrier belt 50 are of a curvilinear nature, and wherein the terminal portions of elongate spacer block 56 is of a curvilinear nature to provide an overall tubular or cylindrical shape for carrier belt embodiment 50. When carrier belt 50 is flexed in the undulate form, the folded juncture between every vertically aligned segment is of an arcuate configuration. An electrical conductor conduit 11 and a tubular conduit 52 for fluid power are conveniently shown.

The requisite undulate foldability for the carrier belt housing is affected by several independent variables, including the following in the matter so indicated:

A. Directly related to the overall length and weight of the carrier belt.
B. Inversely related to the overall width and height (thickness) of the carrier belt.
C. Inversely related to the rigidity and height (thickness) of the spacer means.
D. When multi-block spacer means are employed, inversely related to the width and number of blocks per length of the carrier belt.
E. Directly related to the cantilever bend flexibility of the elongate shields.

Obviously, it would be an exceedingly tedious and a practically impossible task to assign mathematical parameters to the nine or more variables which have a bearing upon the requisite undulate foldability for the carrier belt housing 10. However, when the following typical, though non-limiting, illustrative parameters are employed for the FIGURE 1 imbricate variety, an unduly foldable carrier belt is provided.

(1) Overall length of carrier belt: 22 feet
(2) Weight of carrier belt: 46 pounds
(3) Width of carrier belt: 6 inches
(4) Height of carrier belt: 2.25 inches
(5) Wooden rigid spacer blocks having
   (a) Height: 1.625 inches
   (b) Width: 0.750 inch
   (c) Intervals between blocks: 4.00 inches
(6) Structurally continuous elongate shield (14) as a fiber-reinforced rubber strap:
   (a) Thickness: 0.219 inch
   (b) Width: 6.00 inches
   (c) Cantilever bend: 5.625 inches per 18 inch length.
(7) Imbricate multi-panel shield (15): (6″ x 6″ panels of strap 14 at 2″ overlap).

From the foregoing, the construction and operation of the carrier system for supplying power lines will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be restored to, falling within the scope of the appended claims.

I claim:
1. A carrier system for supplying power lines to a reciprocating machine, said carrier system comprising:
   (A) A generally horizontal elongate carrier belt adapted to surroundably accommodate and carry at least one elongate power line slidably contained therein, said carrier belt comprising a pair of substantially parallel elongate opposed shields separated by spacer means, said carrier belt being undulately foldable upon itself in the direction of either shield for at least three vertically aligned segments such that each upper segment of the undulate structure readily assumes an elongate and slidable intra-shield contact with the segment immediately therebeneath, the folded region at the juncture between every consecutively adjacent segment being of an arcuate configuration, at least one of said two elongate opposed shields being a generally flexible structurally continuous strap that is sufficiently flexible to be undulately foldable upon itself in either of two opposite directions for at least three vertically aligned segments such that each upper undulate segment readily assumes an elongate contact with the segment immediately therebeneath, the folded region at the juncture between every consecutively adjacent segment being of an arcuate configuration, the exposed outward surface of each elongate shield being slidable upon itself when the carrier belt is disposed in said undulate form, said spacer means being located between and directly attached to the inner surfaces of said generally parallel opposed shields, the transverse direction of said spacer means being substantially co-extensive with the inner width of the two opposed shields, said spacer means being provided with at least one perforation therethrough in the elongate direction of said shields to provide at least one elongate internal passageway that is substantially parallel to the elongate central axes of said shields, said passageway being substantially coextensive with the length of said carrier belt, and (B) An elongate guidance trough having upright parallel interior sides, an open top, a lower boundary portion, and a linearly generated elongate central axis, a terminal portion of said carrier belt having a transverse and pivotal relationship with the lower boundary portion of said guidance trough so that a terminal segment of said carrier belt may lie horizontally along the interior bottom of said trough, the trough side walls being of sufficient parallel spacing to slidably restrain the carrier belt lateral edges, the trough side walls being of sufficient height to so laterally restrain at least three vertically aligned segments of the undulately foldable carrier belt.

2. A carrier system for supplying power lines to a reciprocating machine, said carrier system comprising:
(A) A generally horizontal flexible carrier belt adapted to surroundably accommodate and carry at least one elongate power line loosely contained therein, said carrier belt comprising a pair of substantially parallel elongate opposed shields separated by intervening spacer means, said carrier belt being undulately foldable upon itself in the direction of either shield for a plurality of vertically aligned segments such that each upper segment of the undulate structure readily assumes an elongate and slidable intra-shield contact with the segment immediately therebeneath, the folded region at the juncture between every consecutively adjacent segment being of a curvilinear-arcuate configuration,
 (i) at least one of said two elongate opposed shields being as a generally flexible structurally continuous strap that is sufficiently flexible to be undulately foldable upon itself in either of two opposite directions for a plurality of vertically aligned segments such that each upper undulate segment readily assumes an elongate contact with the segment immediately therebeneath, the folded region at the juncture between every consecutively adjacent segment being of a curvilinear-arcuate configuration, the exposed outward surface of each elongate shield being slidable upon itself when the carrier belt is disposed in said undulate form, and
 (ii) said spacer means comprising a plurality of elongate blocks, said blocks being attached between said elongate shields at substantially regular intervals, the transverse elongate axes of said spacer blocks being substantially co-extensive with the inner width of the elongate shields and being substantially perpendicular to the elongate central axes of said elongate shields, each of said spacer blocks being provided with at least one perforation therethrough in the elongate direction of said shields to provide at least one elongate internal passageway that is substantially parallel to the elongate central axes of said opposed shields, satid passageway being substantially coextensive with the length of said carrier belt, and (B) An elongate guidance trough having upright parallel interior sides, an open top, a substantially flat interior bottom portion, and a linearly generated elongate central axis, a terminal portion of said carrier belt having a transverse and pivotal relationship with the lower boundary of said guidance trough so that a terminal segment of said carrier belt may lie horizontally along the interior bottom of said trough, the trough side walls being of sufficient parallel spacing to slidably restrain the carrier belt, the trough side walls being of sufficient height to laterally restrain a plurality of vertically aligned segments of the undulately foldable carrier belt.

3. The carrier system of claim 2 wherein one of said elongate shields is an inherently undulately foldably flexible strap, and wherein the other of said elongate shields is of a multi-panel flap-like imbricate overlapping structure, a fixed end of each of said imbricate panels being attached to a spacer block, the free end of each panel overlapping the fixed end of an adjacently contiguous panel, said panel free ends being the closer to that end of the carrier belt which is attached within said trough.

4. The carrier system of claim 2 wherein said two elongate opposed shields comprise a pair of rectangular, substantially conterminous flexible straps, wherein the respective spacer blocks possess a generally rectangular cross-sectional shape in a direction normal to the tranverse elongate axis of said spacer block, wherein both ends of every block elongate direction perforation are slightly enlarged with a chamfered portion to permit ready flexure of a flexible conduit therein, and wherein the cross-sectional shape of said elongate trough is substantially rectangular.

5. The carrier system of claim 4 wherein the respective transverse elongate outer corners of said spacer blocks are chamfered to allow flexure of said elongate strap shields.

6. The carrier system of claim 5 wherein one end of said carrier belt is hingeably attached at the interior bottom of said guidance trough.

7. The carrier system of claim 1 wherein at least one internal passageway of said carrier belt contains a generally horizontal flexible power line conduit slidably disposed therein, said flexible conduit being undulately foldable upon itself in either of two opposite directions for at least three vertically aligned segments, the folded juncture between every consecutively adjacent segment being of an arcuate configuration, the elongate length of said flexible conduit being at least coextensive with the elongate length of said carrier belt.

8. The carrier system of claim 2 wherein at least one internal passageway of said carrier belt contains a generally horizontal flexible power line conduit slidably disposed therein, said flexible conduit being undulately foldable upon itself in either of two opposite directions for a plurality of vertically aligned segments, the folded juncture between every consecutively adjacent segment being of a curvilinear arcuate configuration, the elongate length of said flexible conduit being at least coextensive with the elongate length of said carrier belt.

9. A carrier system for supplying power lines to a reciprocating machine, said carrier system comprising: a generally horizontal elongate carrier belt adapted to surroundably accommodate and carry a plurality of elongate power lines slidably contained therein, said carrier belt comprising a pair of substantially parallel elongate opposed shields separated by intervening spacer means attached to the respective inner surfaces of said opposed shields, the respective outer surfaces of said shields being substantially planar, said carrier belt being undulately foldable upon itself in the direction of either shield for a plurality of vertically aligned segments such that each upper segment of the undulate structure readily assumes an elongate and slidable intra-shield contact with the segment immediately therebeneath, the ratio of the transverse width of the carrier belt to the length thereof exceeding about 1:30, the folded region at the juncture between every consecutively adjacent segment being of a curvilinear-arcuate configuration, at least one of said two elongate opposed shields being as a generally flexible structurally continuous strap that is undulately foldable upon itself in either of two opposite directions for a plurality of vertically aligned segments such that each upper segment of the undulate structure readily assumes an elongate and slidable contact with the segment immediately therebeneath, the folded region at the juncture between every consecutively adjacent segment being of a curvilinear-arcuate configuration, the exposed outward surface of each elongate shield being slidable upon itself when the carrier belt is disposed in said undulate form, said spacer means being located between and directly attached to the inner surfaces of said opposed shields, said spacer means being provided with a plurality of distinct perforations therethrough in the elongate direction of said shields to provide a plurality of distinct elongate internal passageways each being substantially parallel to the elongate central axes of said shields, said passageways being substantially coextensive with the length of said carrier belt, and a terminal portion of said carrier belt having a transverse stationary and pivotal relationship to a longitudinal central axis that is substantially parallel to the path of said reciprocating machine.

References Cited
UNITED STATES PATENTS

| | | | |
|---|---|---|---|
| 2,864,907 | 12/1958 | Waninger | 138—110 X |
| 2,865,979 | 12/1958 | Klassen. | |
| 3,042,760 | 7/1962 | Thumin | 191—12 |
| 3,161,205 | 12/1964 | Merker | 137—355.17 |
| 3,248,487 | 4/1966 | Dechantsreiter | 137—355.17 X |
| 3,300,572 | 1/1967 | Dahlgren | 191—12 X |

M. CARY NELSON, *Primary Examiner.*

S. SCOTT, *Assistant Examiner.*